US008463910B2

(12) United States Patent
Hatasaki et al.

(10) Patent No.: US 8,463,910 B2
(45) Date of Patent: Jun. 11, 2013

(54) COMPUTER SYSTEM AND PERFORMANCE ASSURANCE METHOD

(75) Inventors: Keisuke Hatasaki, Kawasaki (JP); Yasunori Kaneda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/996,185

(22) PCT Filed: Nov. 18, 2010

(86) PCT No.: PCT/JP2010/006753
§ 371 (c)(1),
(2), (4) Date: Dec. 3, 2010

(87) PCT Pub. No.: WO2012/066597
PCT Pub. Date: May 24, 2012

(65) Prior Publication Data
US 2012/0271907 A1 Oct. 25, 2012

(51) Int. Cl.
*G06F 15/173* (2006.01)
*G06F 15/16* (2006.01)
*G06F 15/167* (2006.01)
*H04L 12/28* (2006.01)

(52) U.S. Cl.
USPC ....... 709/226; 709/215; 709/229; 370/395.41

(58) Field of Classification Search
None
See application file for complete search history.

(56) References Cited

U.S. PATENT DOCUMENTS

| | | | | |
|---|---|---|---|---|
| 7,590,746 | B2 * | 9/2009 | Slater et al. | 709/229 |
| 7,782,869 | B1 * | 8/2010 | Chitlur Srinivasa | 370/395.41 |
| 2004/0143664 | A1 * | 7/2004 | Usa et al. | 709/226 |
| 2010/0106816 | A1 | 4/2010 | Gultai et al. | |

OTHER PUBLICATIONS

Vmware; http://ja.wikipedia.org/wiki/Vmware; Nov. 24, 2010; 6 pages; Vmware, Inc.
Virtage Navigator: Comprehensive service platform BladeSymphony; http://www.hitachi.co.jp/products/blade symphony/virtual/virtage_navi. html; Nov. 24, 2010; 10 pages; Hitachi, Ltd.
Song, Ying, et al.; Multi-tiered On-Demand Resource Scheduling for VM-Based Data Center; 9th IEEE/ACM International Symposium on Cluster Computing and the Grid; 2009; pp. 148-155.
Barham, Paul, et al.; Xen and the Art of Virtualization; SOSP'03, Oct. 19-22, 2003, Bolton Landing, New York, USA; 14 pages.
PCT International Search Report and Written Opinion on application PCT/JP2010/006753 dated Dec. 28, 2011; 12 pages.

* cited by examiner

*Primary Examiner* — Wen-Tai Lin
(74) *Attorney, Agent, or Firm* — Foley & Lardner LLP

(57) ABSTRACT

Proposed are a computer system and a performance assurance method capable of stabilizing the I/O performance of a plurality of logical partitions sharing a network path.
One or more sets of an application logical partition for executing processing according to a user's application and an I/O logical partition for controlling execution or wait of I/O processing of the application logical partition are built in a physical server, a network path that is shared by a plurality of application logical partitions and its maximum performance are detected, a share value of each application logical partition sharing the relevant network path is calculated based on the detected maximum performance of the network path and a pre-designated required performance of each application logical partition, a period of time for the corresponding application logical partition to execute or cause the I/O processing to wait, in a unit time, to each I/O logical partition is set based on the calculation result, and I/O logical partition controls the execution or wait of the I/O processing by the relevant logical partition so that the corresponding application logical partition executes or causes the I/O processing to wait in the set period of time.

12 Claims, 15 Drawing Sheets

FIG.6

| SERVER ID | APPLICATION LOGICAL PARTITION ID | VIRTUAL WWN | PHYSICAL WWN |
|---|---|---|---|
| 1 | LPAR1 | vWWN1 | pWWN1 |
|   | LPAR2 | vWWN2 | pWWN2 |
| 2 | LPAR3 | vWWN3 | pWWN3 |
| 3 | LPAR4 | vWWN4 | pWWN4 |
|   | LPAR5 | vWWN5 |   |
| 74A | 74B | 74C | 74D |

| STORAGE APPARATUS ID | STORAGE PORT WWW | LUN | SERVER WWN |
|---|---|---|---|
| Storage1 | sWWN1 | LU1 | vWWN1 |
| Storage1 | sWWN2 | LU2 | vWWN2 |
| Storage1 | sWWN3 | LU1 | vWWN3 |
| Storage2 | sWWN4 | LU4 | vWWN4<br>vWWN5 |
| 75A | 75B | 75C | 75D |

| PATH ID | STORAGE PORT WWW | VIRTUAL WWN | PHYSICAL WWN | PERFORMANCE |
|---|---|---|---|---|
| A | sWWN1 | vWWN1<br>vWWN3 | pWWN1<br>pWWN3 | 4Gbps |
| B | sWWN2 | vWWN2 | pWWN2 | 4Gbps |
| C | sWWN3 | vWWN4<br>vWWN5 | pWWN4<br>pWWN5 | 8Gbps |
| 76A | 76B | 76C | 76D | 76E |

| APPLICATION LOGICAL PARTITION ID | VIRTUAL WWN | REQUIRED PERFORMANCE | PATH ID | SHARE VALUE (max:100) |
|---|---|---|---|---|
| LPAR1 | vWWN1 | 1Gbps | A | 25 |
| LPAR2 | vWWN2 | 4Gbps | B | 100 |
| LPAR3 | vWWN3 | 3Gbps | A | 75 |
| LPAR4 | vWWN4 | 4Gbps | C | 50 |
| LPAR5 | vWWN5 | 2Gbps | C | 25 |
| 77A | 77B | 77C | 77D | 77E |

75 LOGICAL VOLUME CONFIGURATION TABLE

| STORAGE PORT | SERVER WWN |
|---|---|
| sWWN1 | vWWN1 |
| sWWN2 | vWWN2 |
| sWWN1 | vWWN3 |
| sWWN3 | vWWN4<br>vWWN5 |

GROUP WITH SAME STORAGE PORT

SP5A

| sWWN1 | vWWN1<br>vWWN3 |
|---|---|
| sWWN2 | vWWN2 |
| sWWN3 | vWWN4<br>vWWN5 |

74 LOGICAL PARTITION CONFIGURATION TABLE

| | | VIRTUAL WWN | PHYSICAL WWN |
|---|---|---|---|
| | | vWWN1 | pWWN1 |
| | | vWWN2 | pWWN2 |
| | | vWWN3 | pWWN3 |
| | | vWWN4 | pWWN4 |
| | | vWWN5 | |

CONVERT VIRTUAL PORT INTO PHYSICAL PORT — SP5B

76 PATH TABLE

| PATH | STORAGE PORT | VIRTUAL WWN | PHYSICAL WWN | |
|---|---|---|---|---|
| A | sWWN1 | vWWN1<br>vWWN3 | pWWN1<br>pWWN3 | |
| B | sWWN2 | vWWN2 | pWWN2 | |
| C | sWWN3 | vWWN4<br>vWWN5 | pWWN4 | |

ASSIGN PATH ID — SP5C

FIG.14

77 QoS TABLE

| APPLICATION LOGICAL PARTITION | VIRTUAL WWN | REQUIRED PERFORMANCE | PATH | SHARE VALUE (max:100) |
|---|---|---|---|---|
| LPAR1 | vWWN1 | 1Gbps | A | 25 |
| LPAR2 | vWWN2 | 4Gbps | B | 100 |
| LPAR3 | vWWN3 | 3Gbps | A | 75 |
| LPAR4 | vWWN4 | 4Gbps | C | 50 |
| LPAR5 | vWWN5 | 2Gbps | C | 25 |

CALCULATION FORMULA OF SHARE VALUE:

$$\frac{\text{REQUIRED PERFORMANCE OF VIRTUAL PORT USING PATH}}{\text{MAXIMUM PATH PERFORMANCE}} = \text{SHARE VALUE OF RELEVANT VIRTUAL PORT}$$

76 PATH TABLE

| PATH | PERFORMANCE |
|---|---|
| A | 4Gbps |
| B | 4Gbps |
| C | 8Gbps |

COMPUTER SYSTEM AND PERFORMANCE ASSURANCE METHOD

TECHNICAL FIELD

The present invention relates to a computer system and a performance assurance method, and, in particular, can be suitably applied to a computer system to which server virtualization technology based on a logical partitioning method is applied, and in which a network path to a storage apparatus is shared by a plurality of logical partitions built in a physical server.

BACKGROUND ART

Conventionally, known is server virtualization technology of building a plurality of virtual servers (hereinafter referred to as the "virtual servers") in one physical server. As a result of using this kind of server virtualization technology, it is possible to consolidate a plurality of physical servers and improve the usage efficiency of resources.

As one method of realizing the practical application of this kind of server virtualization technology, conventionally, a sharing method of a plurality of virtual servers sharing resources such as a CPU, memory and I/O (input/output) device of one physical server, and assigning the necessary resource to the virtual server as needed has been proposed (for example, refer to PTL 1 and NPL 1).

Moreover, as another method of realizing the practical application of the server virtualization technology, a logical partitioning method of dividing resources such as a CPU, memory and I/O (input/output) device of one physical server into a plurality of logical partitions (these correspond to the virtual servers and are hereinafter referred to as the "logical partitions") has also been proposed (for example, refer to NPL 2).

CITATION LIST

Patent Literature

PTL 1: Specification of U.S. patent application Ser. No. 12/260,041

Non-Patent Literature

NPL 1: VMware, [online], Wikipedia, [searched on Sep. 21, 2010], Internet <URL: http://ja.wikipedia.org/wiki/VMware>

NPL 2: Comprehensive service platform BladeSymphony, [online], Hitachi, Ltd., [searched on Sep. 21, 2010], Internet<URL: http://www.hitachi.co.jp/products/bladesymphony/virtual/virtage_navi.html>

SUMMARY OF INVENTION

Technical Problem

However, with a computer system applying the sharing method described in PTL 1 and NPL 1, there is a problem in that the execution performance of an application program running on the virtual server is unstable as a result of being affected by the other virtual servers running on the same physical server.

Moreover, with a computer system applying the logical partitioning method described in NPL 2, although the execution performance of an application program running on the logical partition can be stabilized, if the logical partitions running on a plurality of physical servers are to share the same storage apparatus, there is a problem in that the I/O performance of a certain logical partition will be affected by the use of the storage apparatus by the other logical partitions.

In response to the foregoing problems, according to the computer system adopting the sharing method described in PTL 1 and NPL 1, it is possible to prevent a specific virtual server from being affected by the use of the storage apparatus by the other virtual servers as a result of preferentially assigning the storage I/O of a virtual server of high priority when the I/O latency of the storage apparatus shared by a plurality of virtual servers becomes a certain level or higher.

Nevertheless, with a computer system adopting the sharing method, since the I/O performance of the virtual server changes considerably when the I/O latency is lower than a certain level and when it is higher than a certain level, there is a problem in that it is difficult to achieve the stability of the execution performance of an application program.

The present invention was devised in view of the foregoing points. Thus, an object of this invention is to propose a computer system and a performance assurance method capable of stabilizing the I/O performance of a plurality of logical partitions sharing a network path to the storage apparatus.

Solution to Problem

In order to resolve the foregoing problems, the present invention provides a computer system comprising a plurality of physical servers each with a set of one or more application logical partitions and I/O logical partitions built therein, a storage apparatus for providing a storage area to the physical servers, and a management server connected to the physical servers, wherein the application logical partition of the physical server executes processing according to a user's application, wherein the I/O logical partition of the physical server controls execution or wait of I/O processing of the application logical partition, wherein the management server, among network paths connecting the physical server and the storage apparatus, detects the network path that is shared by a plurality of the application logical partitions and a maximum performance of the relevant network path, calculates a share value for each of the application logical partitions sharing the relevant network path based on the detected maximum performance of the network path and a pre-designated required performance for each of the application logical partitions, and sets a period of time for the corresponding application logical partition to execute or cause the I/O processing to wait, in a unit time, to each of the I/O logical partitions based on the calculated share value of each of the application logical partitions, and wherein the I/O logical partition of the physical server controls the execution or wait of the I/O processing of the relevant application logical partition so that the corresponding application logical partition executes or causes the I/O processing to wait in the period of time set by the management server.

The present invention additionally provides a performance assurance method in a computer system including a plurality of physical servers, a storage apparatus for providing a storage area to the physical servers, and a management server connected to the physical servers, wherein each of physical servers has a set of one or more application logical partitions and I/O logical partitions built therein, wherein the application logical partition of the physical server executes processing according to a user's application, wherein the I/O logical partition of the physical server controls execution or wait of I/O processing of the application logical partition, and wherein the method comprises a first step of the management server detecting, among network paths connecting the physical server and the storage apparatus, the network path that is shared by a plurality of the application logical partitions and a maximum performance of the relevant network path, a second step of the management server calculating a share value for each of the application logical partitions sharing the relevant network path based on the detected maximum performance of the network path and a pre-designated required performance for each of the application logical partitions, a third step of the management server setting a period of time for the corresponding application logical partition to execute or cause the I/O processing to wait, in a unit time, to each of the I/O logical partitions based on the calculated share value of each of the application logical partitions, and a fourth step of the I/O logical partition of the physical server controlling the execution or wait of the I/O processing of the relevant application logical partition so that the corresponding application logical partition executes or causes the I/O processing to wait in the period of time set by the management server.

Consequently, according to the foregoing computer system and performance assurance method, it is possible to prevent the I/O processing of an application logical partition from being affected by the I/O processing of another application logical partition using the same network path.

Advantageous Effects of Invention

According to the present invention, it is possible to stabilize the I/O performance of a plurality of application logical partitions sharing a network path to the storage apparatus.

BRIEF DESCRIPTION OF DRAWINGS

FIG. 6 is a conceptual diagram explaining the logical partition configuration table.

FIG. 7 is a conceptual diagram explaining the logical volume configuration table.

FIG. 8 is a conceptual diagram explaining the path table.

FIG. 9 is a conceptual diagram explaining the QoS table.

FIG. 11 is an overview diagram explaining the path detection processing.

FIG. 14 is an overview diagram explaining the share value calculation method.

DESCRIPTION OF EMBODIMENTS

An embodiment of the present invention is now explained in detail with reference to the attached drawings.

(1) Configuration of Computer System According to this Embodiment

Figure 1:
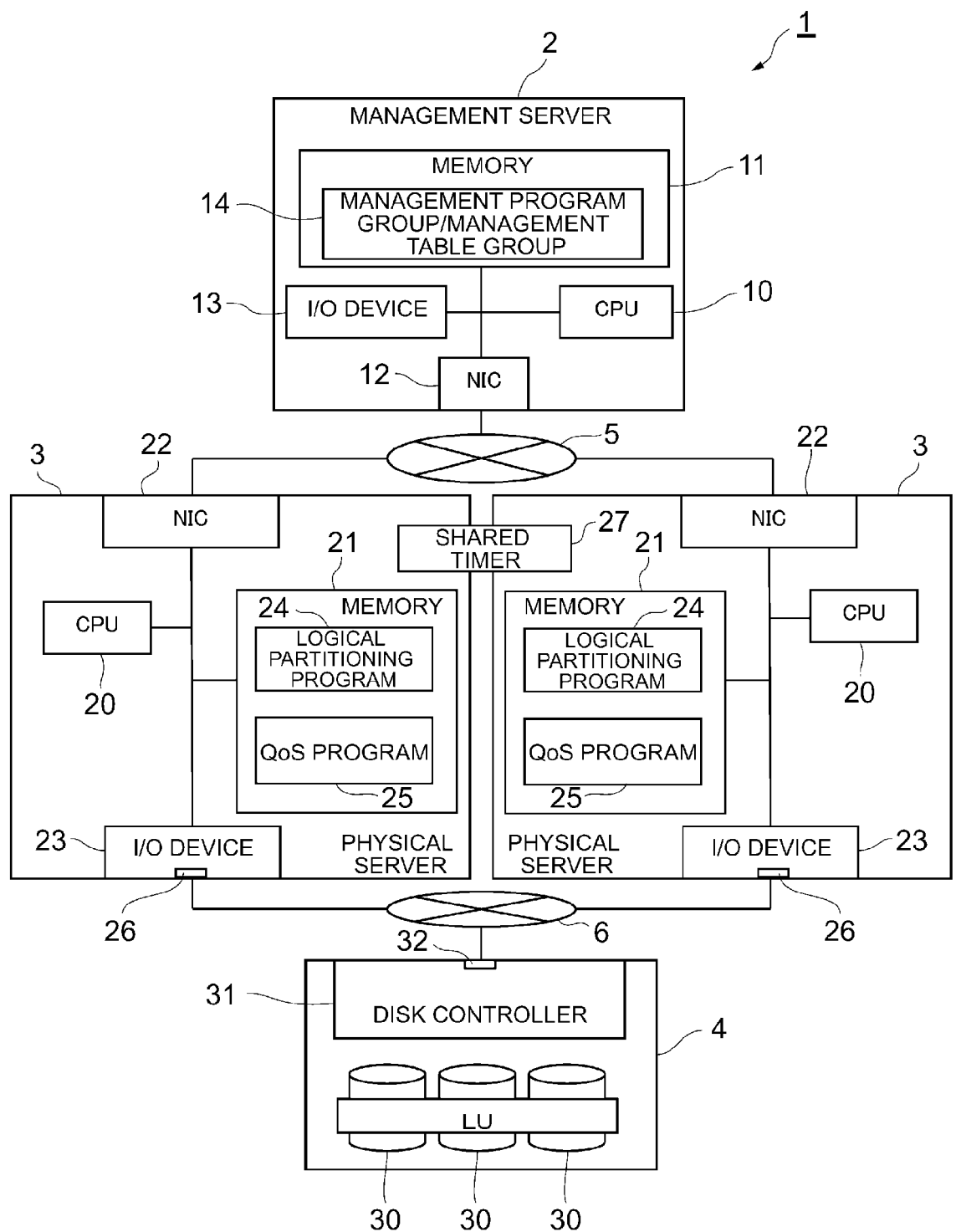
FIG. 1 is a block diagram showing the schematic configuration of the computer system according to the first embodiment.

FIG. 1 shows the overall computer system 1 according to this embodiment. The computer system 1 comprises a management server 2, a plurality of physical servers 3 and a storage apparatus 4, and the management server 2 and the plurality of physical servers 3 are connected via a first network 5 configured from a LAN (Local Area Network) or the like, and each of the physical servers 3 and the storage apparatus 4 are connected via a second network 6 configured from a SAN (Storage Area Network) or the like.

The management server 2 is a server apparatus with a function for collecting and displaying necessary information from each of the physical servers 3 and making various settings in the physical server 3, and comprises a CPU (Central Processing Unit) 10, a memory 11, an NIC (Network Interface Card) 12 and an I/O device 13.

The CPU 10 is a processor that governs the operational control of the overall management server 1. The memory 11 is used for storing various control programs and control information, and also used as a work memory of the CPU 10. Various types of processing are executed by the overall management server 2 as described later as a result of the CPU 10 executing the various programs stored in the memory 11. The management program group/management table group 14 is also retained in the memory 11.

The NIC 12 performs protocol control during the communication with the physical server 3 via the first network 5. The I/O device 13 is configured from an input unit such as a keyboard, a switch, a pointing device and/or a microphone, and an output unit such as a monitor display and/or a speaker.

The physical server 3 comprises a CPU 20, a memory 21, an NIC 22 and an I/O device 23. The CPU 20 is a processor that governs the operational control of the overall physical server 3. The memory 21 is primarily used for storing various control programs and control information. The memory 21 stores, as a part of the control programs, a logical partitioning program 24 and a QoS (Quality of Service) program 25. The logical partitioning program 24 is a virtualization program for providing a server virtualization function based on the logical partitioning method, and one or more logical partitions corresponding to the virtual servers are built in the physical server 3 based on the function of the foregoing logical partitioning program. The QoS program 25 will be described later in detail.

The NIC 22 functions as an interface for performing protocol control during the communication with the management server 2 via the first network 5. The I/O device 23 is an interface for performing protocol control during the communication with the storage apparatus 4, and comprises one or more physical ports 26. Used as the I/O device 23 may be, for example, an NIC, an HBA (Host Bus Adaptor), a CNA (Converged Network Adapter), a chipset or the like. Each physical port 26 of the I/O device 23 is assigned a unique network address for identifying such physical port 26 on the second network 6. This network address is referred to as a WWN (World Wide Name) in the ensuing explanation.

The respective physical servers 3 share the same shared timer 27, and the same hour can be shared among the respective physical servers 3 based on the shared timer 27. Used as the shared timer 27 may be, for example, a real-time clock that can be shared and accessed by a plurality of physical servers 3, or an NTP (Network Time Protocol) server. Note that, if there are problems in terms of precision of the shared timer 27, a real-time clock loaded in the physical server 3 may be concurrently used.

The storage apparatus 4 is configured from one or more physical disks 30, and a disk controller 31 for controlling the I/O of data to and from the physical disks 30.

The physical disk 30 is configured from an expensive disk such as a SCSI (Small Computer System Interface) disk, or an inexpensive disk device such as a SATA (Serial AT Attachment) disk or an optical disk.

A RAID (Redundant Arrays of Independent Disks) group is configured from one or more physical disks 30, and one or more logical volumes LU are defined in the physical storage area provided by the respective physical disks configuring the one RAID group. Data from the physical server 3 is stored in units of blocks (hereinafter referred to as the "logical blocks") of a prescribed size in the logical volume LU.

Each logical volume LU is assigned a unique identifier (hereinafter referred to as the "LUN (Logical Unit Number)"). In the case of this embodiment, the input and output of data is performed by combining the LUN and a unique number (hereinafter referred to as the "LBA (Logical Block Address)") that is assigned to each of the logical blocks as the address, and designating such address.

The disk controller 31 comprises information processing resources such as a CPU and a memory, and one or more storage ports 32, and is connected to the second network 6 via a port 32. As a result of the CPU executing the various control programs stored in the memory, the read/write processing of data from and to the physical disk 30 is executed according to a request from the physical server 3. Moreover, each storage port 32 is assigned a network address (hereinafter referred to as the "WWN") that is unique to the storage port for identifying the port 32 on the second network 6.

(2) Performance Assurance Function of this Embodiment

The performance assurance method in the computer system 1 is now explained. The computer system 1 is loaded with a performance assurance function for controlling the I/O of the respective logical partitions so as to maintain the I/O performance of the respective logical partitions built in the physical server 3 based on the logical partitioning program loaded in the physical server 3 as a performance that is required by the user (hereinafter referred to as the "required performance").

In reality, the management server 2 of the computer system 1 detects the network path connecting the physical server 3 and the storage apparatus 4 and its maximum performance, controls the period of execution time of the I/O processing of the logical partitions so that the plurality of logical partitions sharing the same network path will respectively satisfy the required performance of each of the logical partitions based on the detected network path and its maximum performance and the required performance of each of the logical partitions built in the physical server 3, and thereby causes the foregoing logical partitions to time-share the network path.

Figure 2:
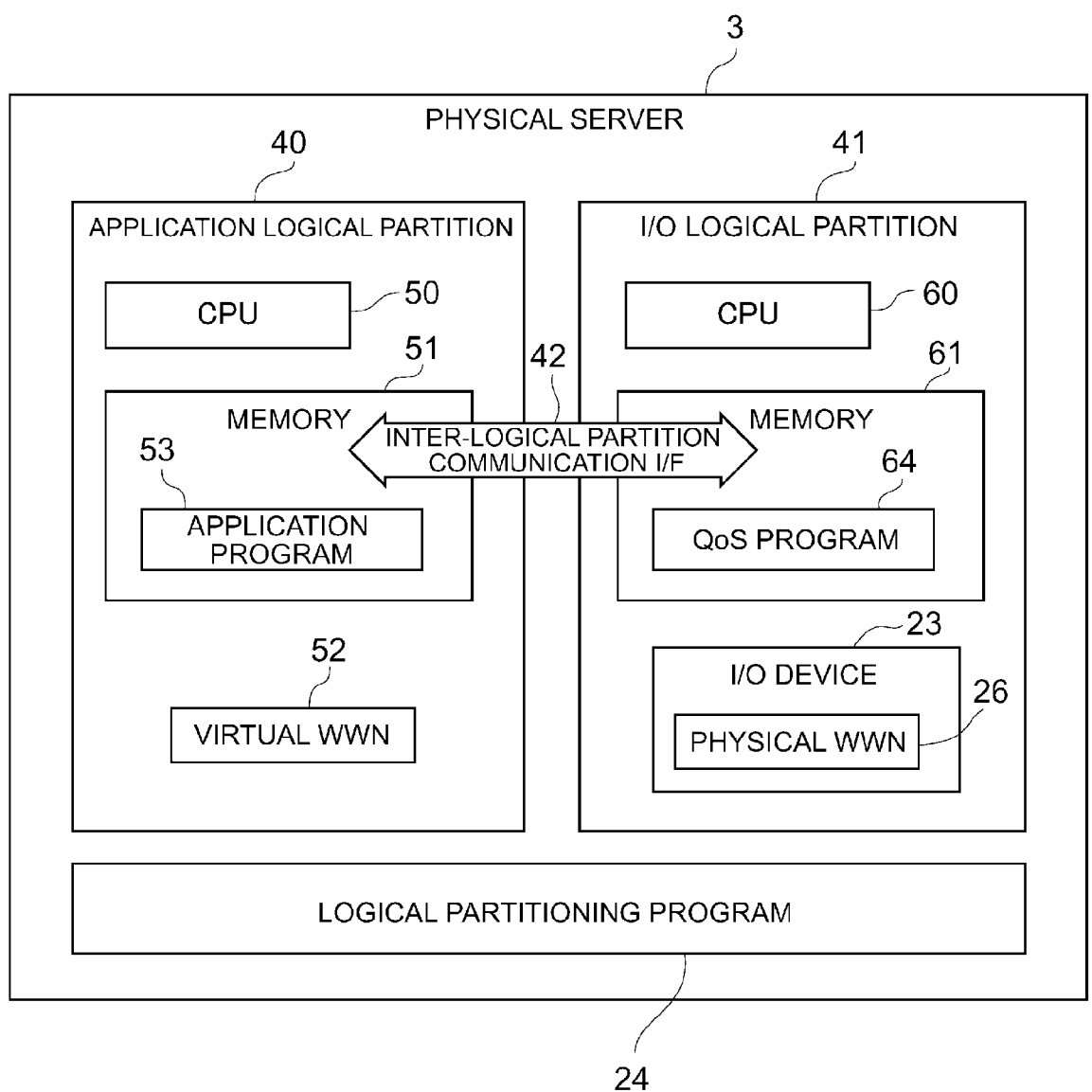
FIG. 2 is a block diagram showing the logical configuration of the server.

As a means for realizing the foregoing performance assurance function, the logical partitioning program 24 loaded in the physical server 3 logically divides, as shown in FIG. 2, the resource of the physical server 3 into a set of one or more application logical partitions 40 and I/O logical partitions 41. The application logical partitions 40 and the I/O logical partitions 41 respectively correspond to the virtual servers, and one I/O logical partition 41 is built for one application logical partition 40. The application logical partition 40 and the I/O logical partition 41 comprise an inter-logical partition communication interface 42, and the sharing of memory and the transfer of data between the application logical partition 40 and the I/O logical partition 41 are performed via the inter-logical partition communication interface 42.

The application logical partition 40 is a virtual server for executing processing according to a user's application, and comprises a virtual CPU 50 realized by time-sharing the CPU 20 (FIG. 1) of the physical server 3, a memory 51 realized by region-dividing the memory 21 (FIG. 1) of the physical server 3, and a plurality of types of virtual resources (not shown) realized by logically dividing other necessary resources. The application logical partition 40 is also provided with a virtual port 52 that is realized by virtualizing the corresponding physical port 26 (FIG. 1) of the I/O device 23 (FIG. 1) of the physical server 3 which was created with a function such as NPIV (N-port ID Virtualization) of the logical partitioning program 24, and a virtual WWN is assigned to the virtual port 52.

Figure 3:
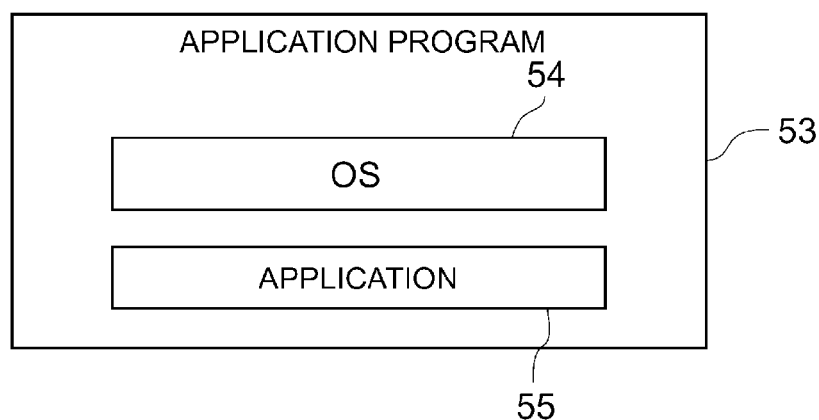
FIG. 3 is a conceptual diagram showing the schematic configuration of the application program.

The memory 51 of the application logical partition 40 stores an application program 53. The application program 53 is a program for executing processing relating to the application of the user using the application logical partition 40 and is configured, as shown in FIG. 3, from an OS (Operating System) 54 and an application 55 running on the OS 54. The application 55 is software related to the user's application, and an I/O command that is issued by the application 55 upon reading or writing data from or to the storage apparatus 4 is transferred to the I/O logical partition 41 via the inter-logical partition communication interface 42. Note that the OS 54 also includes a driver.

Meanwhile, the I/O logical partition 41 is a virtual server for buffering the I/O command issued from the application logical partition 40 configuring the pair, and sending the buffered I/O command to the storage apparatus 4 at a predetermined timing, and comprises a virtual CPU 60 realized by time-sharing the CPU 21 (FIG. 1) of the physical server 3, a memory 61 realized by region-dividing the memory 21 (FIG. 1) of the physical server 3, an I/O device 23 realized by logically dividing the I/O device 23 (FIG. 1), and a plurality of types of virtual resources (not shown) realized by logically dividing other necessary resources. Note that the "physical WWN" of FIG. 3 shows the WWN assigned to the physical port 26 of the I/O device 23 assigned to that I/O logical partition 41.

Figure 4:
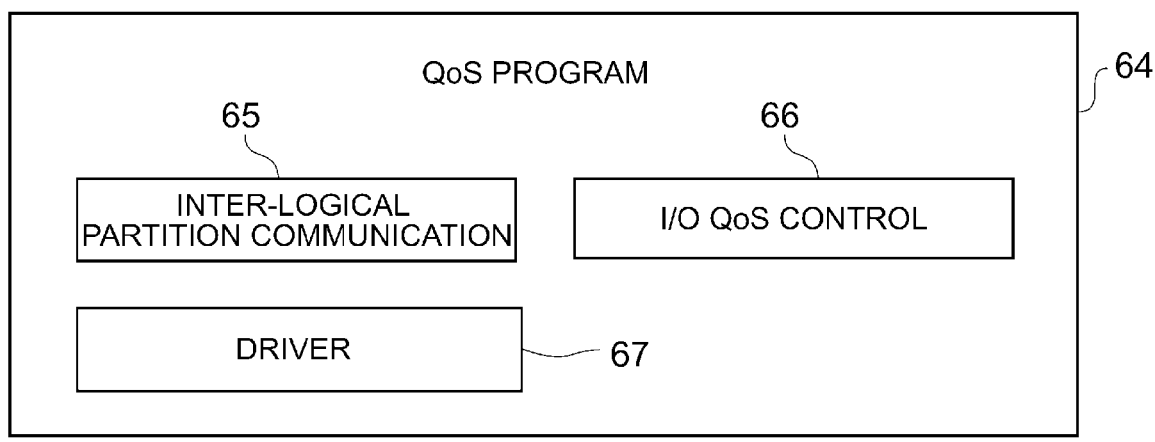
FIG. 4 is a conceptual diagram showing the schematic configuration of the QoS program.

The memory 61 of the I/O logical partition 41 stores a QoS program 64. The QoS program 64 is a program for managing the I/O performance of the application logical partition 40 as described later and is configured, as shown in FIG. 4, from an inter-logical partition communication program 65, an I/O QoS control program 66, a driver 67 and an OS (not shown).

The inter-logical partition communication program 65 is a program for conducting the communication between the application logical partition 40 and the I/O logical partition 41 by using the inter-logical partition communication interface 42 (FIG. 2). For example, notification of interruption from the I/O device 23, transfer of data, reception of requests from the application program 53 to the I/O device 23 and the like are executed by the inter-logical partition communication program 65.

The I/O QoS control program 66 is a program for controlling the execution or wait of the I/O processing in the corresponding application logical partition 40. The foregoing shared timer 27 is used for measuring the execution time and wait time of the I/O processing. The driver 67 is a device driver of the I/O device 23.

Figure 5:
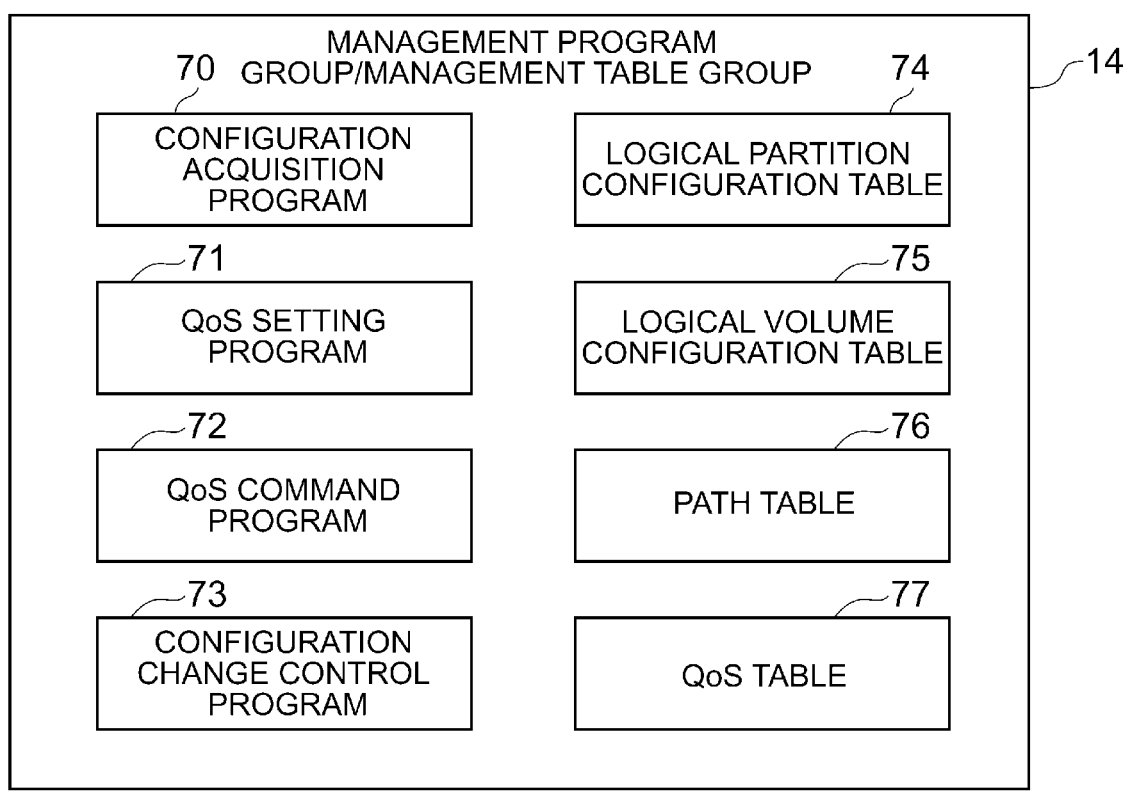
FIG. 5 is a conceptual diagram explaining the programs and tables stored in the memory of the computer system.

FIG. 5 shows a configuration example of the management program group/management table group 14 of the management server 2. The management program group/management table group 14 is configured from a program group including a configuration acquisition program 70, a QoS setting program 71, a QoS command program 72 and a configuration change control program 73, and a table group including a logical partition configuration table 74, a logical volume configuration table 75, a path table 76 and a QoS table 77.

The configuration acquisition program 70 is a program for acquiring information concerning various configurations such as the configuration of the application logical partition 40, the configuration of the logical volume LU in the storage apparatus 4, and the configuration of the respective network paths from the physical server 3 to the storage apparatus 4, and the QoS setting program is a program for setting the I/O performance in accordance with the user's request as the I/O performance of the respective application logical partitions 40.

Moreover, the QoS command program 72 is a program for setting the period of time that the corresponding application logical partition 40 should execute or cause the I/O processing to wait for each of the I/O logical partitions 41 as described later, and the configuration change control program 73 is a program for executing the processing of migrating the application logical partition 40 built in a certain physical server 3 to another physical server 3.

Meanwhile, the logical partition configuration table 74 is a table that is used for managing the configuration of the application logical partition and is configured, as shown in FIG. 6, from a server ID column 74A, an application logical partition ID column 74B, a virtual WWN column 74C and a physical WWN column 75D.

The server ID column 74A stores the identifiers (server IDs) respectively assigned to each of the physical servers 3 existing in the computer system 1, and the application logical partition ID column 74B stores the identifier (logical partition ID) assigned to the application logical partition 40 (FIG. 2) built in the corresponding physical server 3. Moreover, the virtual WWN column 74C stores the virtual WWN assigned to the virtual port 52 (FIG. 2) in the corresponding application logical partition 40, and the physical WWN column 74D stores the WWN (physical WWN) assigned to the physical port 26 (that is, which is the substance of the corresponding virtual port 52) associated with the corresponding virtual port 52.

Accordingly, the example of FIG. 6 shows that, for example, two application logical partitions 40 of "LPAR1" and "LPAR2" are built in the physical server 3 with a server ID of "1", a virtual port 52 indicated as "vWWN1" (that is, its substance is "pWWN1") associated with the physical port 26 indicated as "pWWN1" is provided in the application logical partition 40 indicated as "LPAR1", and a virtual port 52 indicated as "vWWN2" (that is, its substance is "pWWN2") associated with the physical port 26 indicated as "pWWN2" is provided in the application logical partition 40 indicated as "LPAR2".

Moreover, the logical volume configuration table 75 is a table that is used for managing the logical volumes LU existing under the control of the port (hereinafter referred to as the "storage port") 26 on the side of the storage apparatus 4 connected to the virtual port 52 in the application logical partition 40 and is configured, as shown in FIG. 7, from a storage apparatus ID column 75A, a storage port WWN column 75B, a LUN column 75C and a server WWN column 75D.

Note that the expression "logical volumes LU existing under the control of the storage port" refers to the logical volumes LU that are being managed by the disk controller 31 (FIG. 1) comprising such storage port 26. In the foregoing case, the same logical volume LU may exist under the control of a plurality of storage ports 32.

The storage apparatus ID column 75A of the logical volume configuration table 75 stores the respective identifiers (storage apparatus IDs) assigned to each of the storage apparatuses 4 existing in the computer system 1, and the storage port WWN column 75B stores the WWN assigned to each of the storage ports 32 (FIG. 1) of the relevant storage apparatus 4. Moreover, the LUN column 75C stores the LUN of the logical volume LU existing under the control of the corresponding storage port 32, and the server WWN column 75D stores the WWN of the physical port 26 of the physical server 3 permitted to access the corresponding logical volume LU.

Accordingly, the example of FIG. 7 shows that, for example, the storage apparatus 4 indicated as "Storage1" is provided with two storage ports 32 each assigned with a network address of "sWWN1" and "sWWN2", the storage port 32 indicated as "sWWN1" is connected to the application logical partition 40 provided with the virtual port 52 (FIG. 2) indicated as "vWWN1" and the application logical partition 40 provided with the virtual port 52 indicated as "vWWN3", and a logical volume LU indicated as "LU1" exists under the control of the storage port 32 indicated as "sWWN1".

The path table 76 is a table that is used for managing the network paths connecting the physical server 3 and the storage apparatus 4 and is configured, as shown in FIG. 8, from a path ID column 76A, a storage port WWN column 76B, a virtual WWN column 76C, a physical WWN column 76D and a performance column 76E.

The path ID column 76A stores the respective identifiers (path IDs) assigned to each of the network paths connecting the physical server 3 and the storage apparatus 4, and the storage port WWN column 76B stores the WWN of the storage port 32 connected to the corresponding network path. Moreover, the virtual WWN column 76C stores the respective virtual WWNs assigned to each of the application logical partitions 40 comprising the virtual port 52 connected to the network path, and the physical WWN column 76D stores the WWN of the physical port 26 of the physical server 3 to which the virtual port 52 is associated.

Moreover, the performance column 76E stores the maximum performance of the corresponding network path. For example, if the maximum performance between the storage port 32 connected to the network path and the network switch (not shown) configuring the second network 6 is 4 Gbps, "4 Gbps" is stored in the corresponding performance column 76E. However, if there are a plurality of network paths between the corresponding storage port 32 and the physical port 26, the maximum performance of the network path with the lowest maximum performance among such network paths is stored in the performance column 76E as the maximum performance of that network path.

Accordingly, FIG. 8 shows that, for example, the network path indicated as "A" is a network path connecting the storage port 32 indicated as "sWWN1" and the physical ports 26 indicated as "pWWN1" and "pWWN3" which are each associated with the virtual port 52 indicated as "vWWN1" or "vWWN3", and its maximum performance is "4 Gbps".

The QoS table 77 is a table that is used for managing the I/O performance (hereinafter referred to as the "required performance") that is requested by the user for each application logical partition 40 and is configured, as shown in FIG. 9, from an application logical partition ID column 77A, a virtual WWN column 77B, a required performance column 77C, a path ID column 77D and a share value column 77E.

The application logical partition ID column 77A stores the respective logical partition IDs assigned to each of the application logical partitions 40 existing in the computer system 1, and the virtual WWN column 77B stores the virtual WWN assigned to the virtual port 52 of the corresponding application logical partition 40. Moreover, the required performance column 77C stores the required performance of the application logical partition 40, and the path ID column 77D stores the path ID of the network path connecting the virtual port 52 of the application logical partition 40 and the storage port 32 of the storage apparatus 4.

In addition, the share value column 77E stores the resource assignment rate (hereinafter referred to as the "share rate") of the virtual port 52 of the application logical partition 40. More specifically, the share value represents the usage rate of the network path that is permitted to the application logical partition 40 in relation to the maximum performance of such network path in cases where that application logical partition 40 is sharing that network path with other application logical partitions 40. Accordingly, the maximum value of the share value is "100" and the total share value of all virtual ports 52 connected to the same network path will be "100" or less.

Accordingly, FIG. 9 shows that the application logical partition 40 indicated as "LPAR1" with a required performance of "1 Gbps" is connected to the storage apparatus 4 via a network path indicated as "A" connected to the virtual port 52 assigned with a virtual WWN of "vWWN1", and the share value in the network path of such application logical partition 40 is "25".

(3) Various Types of Processing of Performance Assurance Function in this Embodiment The various types of processing to be executed by the programs loaded in the management server 2 in relation to the performance assurance function are now explained. Note that, in the ensuing explanation, the although the processing subject of the various types of processing is explained as a "program," it goes without saying that in reality the CPU 10 (FIG. 1) of the management server 2 executes such processing based on the foregoing programs.

(3-1) Configuration Acquisition Processing

Figure 10:
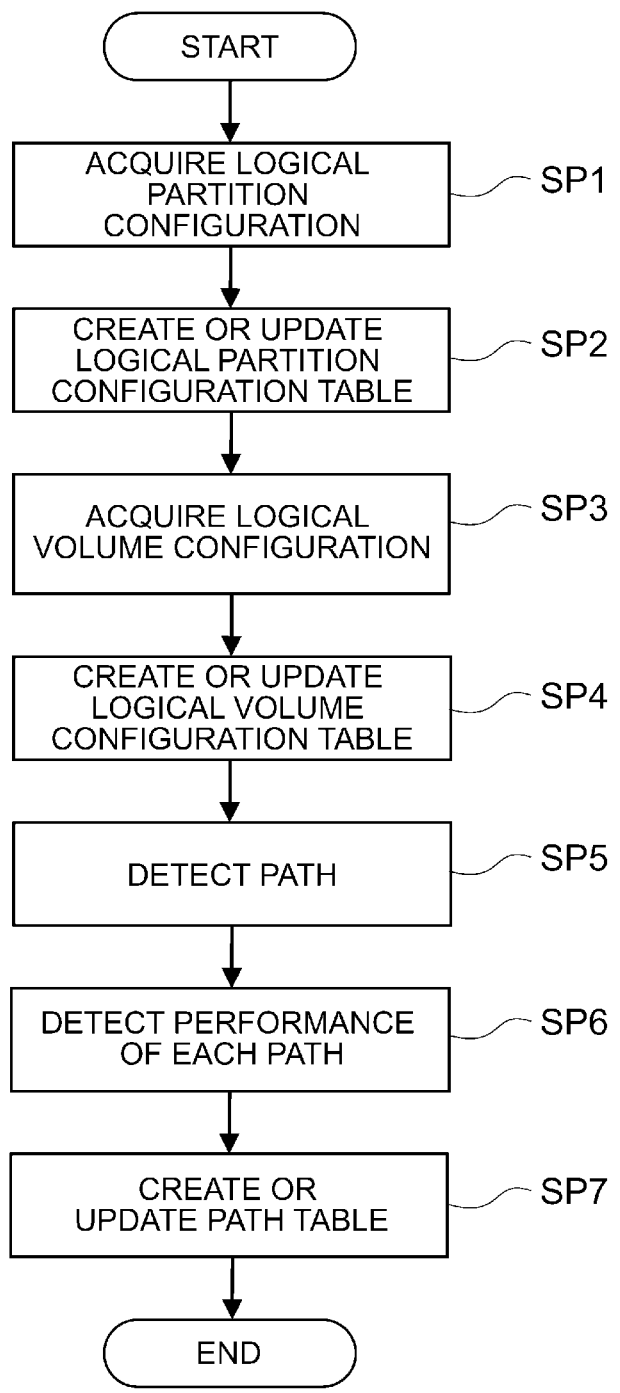
FIG. 10 is a flowchart showing the processing routine of the configuration acquisition processing.

FIG. 10 shows the processing routine of the configuration acquisition processing that is executed by the configuration acquisition program 70 (FIG. 5) of the management server 2 in relation to the foregoing performance assurance function. The configuration acquisition program 70 creates or updates the logical partition configuration table 74 (FIG. 5), the logical volume configuration table 75 (FIG. 1) and the path table 76 (FIG. 1) based on the configuration acquisition processing shown in FIG. 10.

Specifically, the configuration acquisition program 70 starts the configuration acquisition processing when the user operates the management server 2 and inputs a prescribed command, and foremost issues a command to the logical partitioning program 24 (FIG. 1) of each of the physical servers 3 to transfer the configuration information of all application logical partitions 40 built in that physical server 3 (SP1). Consequently, each of the application logical partitions 40 that received the foregoing command sends the server ID of the physical server 3 in which it was built, its own logical partition ID, the virtual WWN of the virtual port 52 (FIG. 2) provided to itself, and the WWN of the physical port 26 associated with the virtual port 52 (physical port 26 as the substance of the virtual port 52) to the management server 2. The configuration acquisition program 70 thereby acquires the foregoing information.

Subsequently, the configuration acquisition program 70 creates or updates the logical partition configuration table 74 (FIG. 6) based on the virtual WWN of the virtual port 52 of each of the application logical partitions 40 acquired at step SP1, and the WWN of the physical port 26 associated with the virtual port 52 (SP2).

Next, the configuration acquisition program 70 issues a command to the storage apparatus 4 for transferring the configuration information of all logical volumes LU in the storage apparatus 4 (SP3). Consequently, the disk controller 31 of the storage apparatus 4 that received the foregoing command sends its own storage apparatus ID, the WWN of each of the storage ports 32 existing in the self-storage apparatus, the LUN of all logical volumes LU existing under the control of each of the storage ports 32, and the WWN of the physical port 26 of the physical server 3 permitted to access the foregoing logical volumes LU (physical port 26 connected to the storage apparatus 4 via a network path) to the management server 2. The configuration acquisition program 70 thereby acquires the foregoing information.

The configuration acquisition program 70 thereafter creates or updates the logical volume configuration table 75 (FIG. 7) based on the various types of information acquired at step SP3 (SP4).

Subsequently, the configuration acquisition program 70 detects all network paths from the physical port 26 of the physical server 3 to the storage port 32 of the storage apparatus 4 which are being used by each of the application logical partitions 40 of the physical server 3 (SP5). Specifically, the configuration acquisition program 70 foremost, as shown in FIG. 11, refers to the logical volume configuration table 75, and groups the virtual ports 52 connected to the same storage port 32 of the same storage apparatus 4 (virtual ports 52 in the application logical partition 40 built in the physical server 3) (SP5A). Next, the configuration acquisition program 70 uses the logical partition configuration table 74 and converts, for each group, the virtual WWN of the corresponding virtual port 52 to the WWN of the physical port 26 associated with that virtual port 52 (SP5B). The configuration acquisition program 70 thereafter sets a path ID for each of the groups (SP5C).

Next, the configuration acquisition program 70 detects the performance of each of the network paths detected at step SP5 (SP6). Here, the performance of the network path refers to the maximum performance of the network path with the lowest maximum performance among the network paths that are common between the physical ports 26 of each of the physical servers 3 connected to such network paths and the storage ports 32 of the connection destination. The configuration acquisition program 70 requests the I/O device 23 (FIG. 1) of the physical server 3, each of the network switches configuring the second network 6, and the disk controller 31 of the storage apparatus 4 existing on the path between the physical port 26 of each of the physical servers 3 connected to the corresponding network path and the storage port 32 of the connection destination to notify their respective maximum performances.

Note that, with respect to the path information between the physical port 26 of the physical server 3 and the storage port 32 of the storage apparatus 4, let it be assumed that it is stored in advance in an auxiliary storage device or a memory that can be accessed by the configuration acquisition program 70. Moreover, also with respect to the maximum performances of the I/O device 23, the network switch and the disk controller 31 existing on the network path, they may be stored in advance in an auxiliary storage device or a memory that can be accessed by the configuration acquisition program 70. Here, as the method of storing the foregoing information in the auxiliary storage device or the memory, adopted may be a method of storing such information in a database that is used by the configuration acquisition program 70, or a method of causing a user input such information using a GUI (Graphical User Interface) that is displayed on the I/O device 13 of the management server 2 by the configuration acquisition program 70.

The configuration acquisition program 70 thereafter updates or creates the path table 76 (FIG. 8) based on the information (network path and its maximum performance) acquired at step SP5 and step SP6 (SP7), and then ends the configuration acquisition processing.

(3-2) QoS Setting Processing

Figure 12:
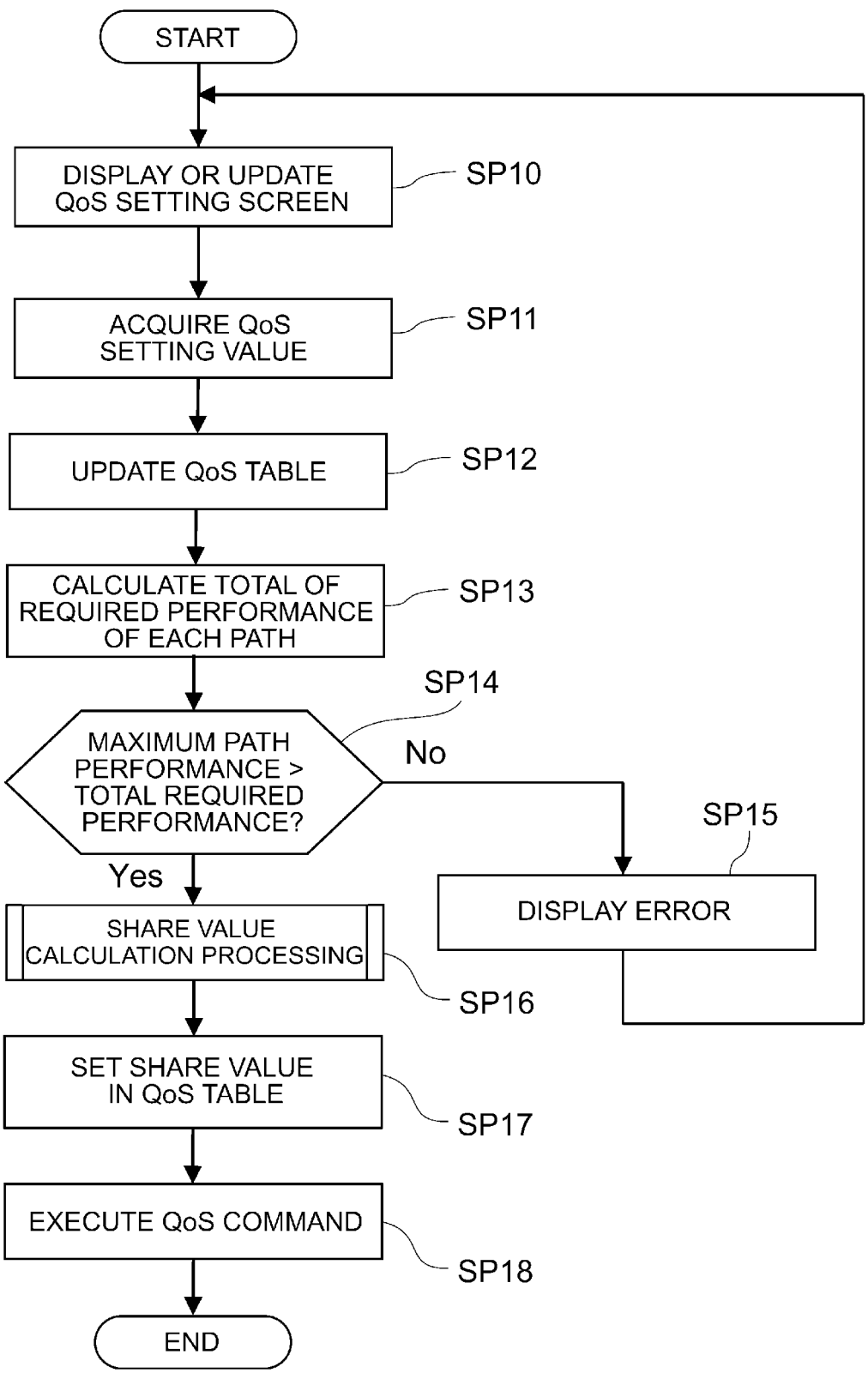
FIG. 12 is a flowchart showing the processing routine of the QoS setting control processing.

FIG. 12 shows the processing routine of the QoS setting processing that is executed by the QoS setting program 71 (FIG. 5) of the management server 2 in relation to the performance assurance function of this embodiment. The QoS setting program 71 calculates, for example, regarding a newly created application logical partition 40, the share value of the network path to be used by such application logical partition 40 and sets the calculated share value in that application logical partition 40 and the I/O logical partition 41 (FIG. 2) configuring a pair therewith based on the QoS setting processing shown in FIG. 12.

Figure 13:
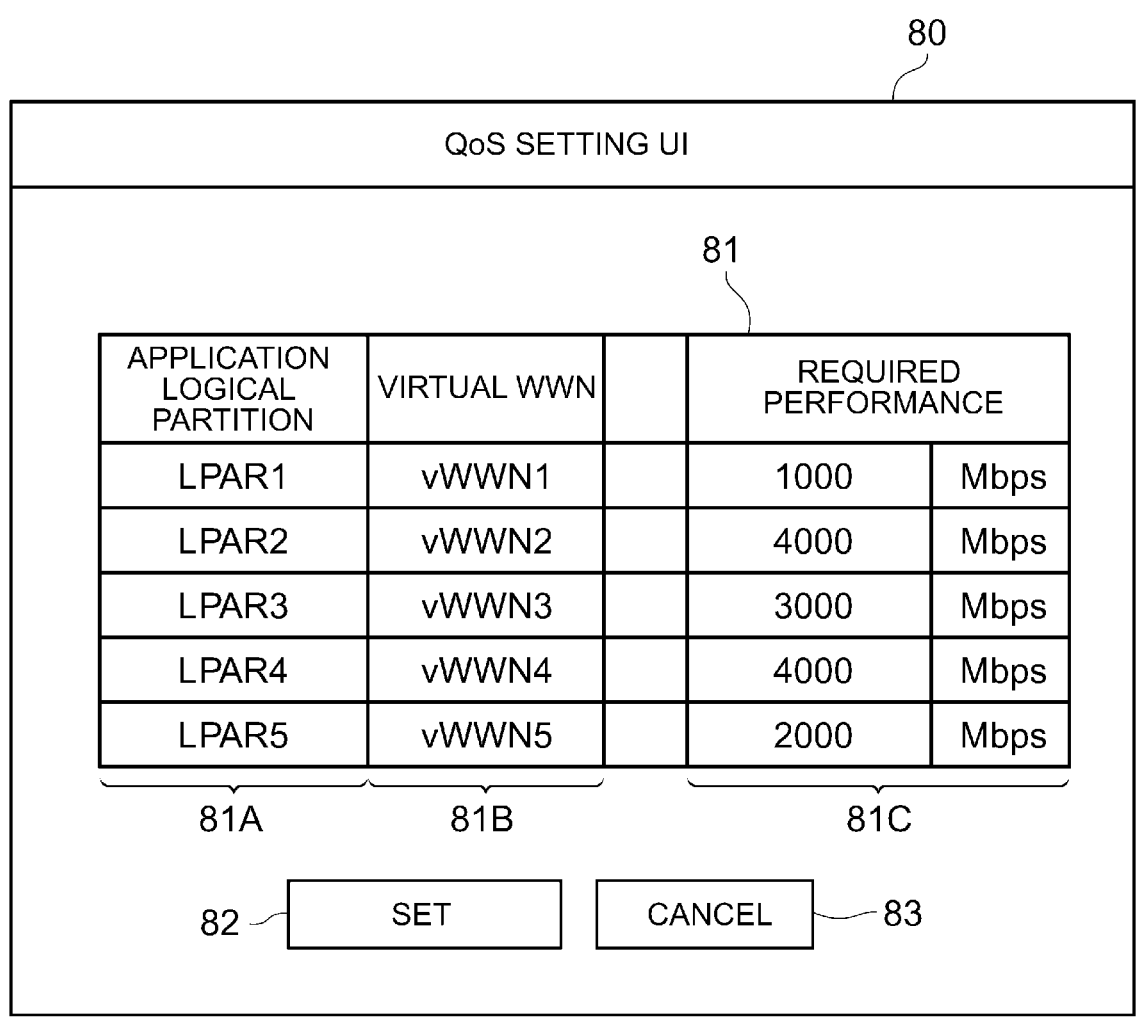
FIG. 13 is a schematic diagram schematically showing the QoS setting screen.

Specifically, the QoS setting program 71 starts the QoS setting processing shown in FIG. 12 when the user operates the I/O device of the management server 2 or a communication terminal (not shown) connected to the management server 2 via a network and inputs a prescribed command, and foremost displays the QoS setting screen 80 shown in FIG. 13 on the I/O device 13 or the display device of the communication terminal (SP1).

Here, the QoS setting screen 80 is a GUI (User Interface) screen for the user to set the required performance of the application logical partition (for example, a newly created application logical partition) 40 and displays, as shown in FIG. 13, a required performance list 81, a set button 82 and a cancel button 83.

The required performance list 81 is configured from an application logical partition ID column 81A, a virtual WWN column 81B and a required performance column 81C, and the application logical partition ID column 81A stores the respective logical partition IDs of all application logical partitions 40 which have been created or will be created in any one of the physical servers 3, and the virtual WWN column 81B stores the virtual WWN of the virtual port 52 (FIG. 2) provided to the corresponding application logical partition 40. Moreover, the required performance column 81C stores the required performance of the application logical partition 40 which was input by the user.

Subsequently, the user operates the management server 2 or the communication terminal displaying the QoS setting screen 80 and inputs the required performance of the application logical partition 40 in the required performance column 81C corresponding to the target application logical partition (for example, a newly created application logical partition) 40 in the required performance list 81. Moreover, the user clicks the set button 82 upon setting the required performance with the input contents, and clicks the cancel button 83 upon cancelling the operation.

Consequently, the QoS setting program 71 uses the QoS setting screen 80 and acquires the logical partition ID, the virtual WWN and the required performance of each application logical partition 40 designated by the user (SP11), and updates the QoS table 77 (FIG. 9) based on the foregoing acquired information as needed (SP12). For example, if a new application logical partition 40 is created, the QoS setting program 71 allocates a new entry (row) in the QoS table 77, and stores the corresponding logical partition ID, virtual WWN and required performance respective acquired at step SP11 in the application logical partition ID column 7A, the virtual WWN column 77B and the required performance column 77C of the foregoing entry. Moreover, the QoS setting program 71 searches for the network path, which is connected to the virtual port 52 (FIG. 2) assigned with the virtual WWN stored in the virtual WWN column 77B, in the path table 76 (FIG. 8), and stores the path ID of the detected network path in the path ID column 77D of the new entry.

Subsequently, the QoS setting program 71 calculates the total value of the required performance (hereinafter referred to as the "total required performance value") of the application logical partitions 40 using that network path for each network path (SP13). For instance, in the example of FIG. 9, since the virtual WWN stored in the virtual WWN column 77B of each of the entries with a path ID of "A" stored in the path ID column 77D is "vWWN1" and "vWWN3", the QoS setting program 71 calculates, as the total required performance value of that network path, the total value of "1 Gbps" as the required performance of the network path connected to the virtual port 52 indicated as "vWWN1" and "3 Gbps" as the required performance of the network path connected to the virtual port 52 indicated as "vWWN3" with respect to the network path indicated as "A".

Next, the QoS setting program 71 compares the maximum performance of the network path stored in the performance column 76E of the path table 76 and the total required performance value of the network path calculated at step SP13 for each network path for which the total required performance value was calculated at step SP13, and determines whether the total required performance value of the network path is smaller than the maximum performance of the network path (SP14).

Here, to obtain a negative result in the determination at step S14P means that the performance of the network paths respectively corresponding to a part or all of the application logical partitions 40 does not satisfy the required performance of such application logical partitions 40 with the user's QoS setting that was made using the QoS setting screen 80. Consequently, the QoS setting program 71 displays a warning on the I/O device 13 or the like of the management server 2 showing the QoS setting screen 80 (SP15), and thereafter returns to step SP10.

Note that, when the foregoing warning is displayed, it is necessary to migrate certain application logical partitions 40 to another physical server 3 so that the total required performance value of each of the application logical partitions 40 using each of the network paths will not exceed the maximum performance of that network path. The migration processing of the application logical partition 40 will be described later.

Meanwhile, to obtain a positive result in the determination at step SP14 means that the corresponding path is satisfying the required performance regarding all application logical partitions 40 based on the user's QoS setting that was made using the QoS setting screen 80. Consequently, the QoS setting program 71 calculates the share value of the virtual port 52 in relation to the network path connected to such virtual port 52 for each of the virtual ports 52 of each of the application logical partitions 40 (SP16).

Specifically, the QoS setting program 71 calculates the share value of the virtual port 52 by dividing, for each virtual port 52 as shown in FIG. 14, the required performance of that virtual port 52 by the maximum performance of the network path connected to that virtual port 52.

The QoS setting program 71 thereafter stores the respective share values of each of the virtual ports 52 calculated at step SP16 in the corresponding share value column 77E of the QoS table 77 (FIG. 9) (SP17).

Subsequently, the QoS setting program 71 sets, based on the share value of each virtual port 52 calculated at step SP16, the period of time for executing the I/O processing, in a prescribed unit time T (10 [mms] for example), to the I/O QoS control program 66 (FIG. 4) of each of the I/O logical partition 41 associated with each of the application logical partitions 40 so that each of such application logical partitions 40 will time-share the relevant network path with the other application logical partitions 40 using the same network path at the rate of the share value set to the virtual port 52 in the application logical partition 40 (SP17).

Specifically, for example, assuming that there are N-number of virtual ports 52 connected to the same network path and the share value of the network path of the n-th virtual port 52 is Sn, the QoS setting program 71 sets the period of time for executing the I/O processing, in the unit time T, to the I/O QoS control program 66 of each of the I/O logical partitions 41 associated with each of the application logical partitions 40 comprising the virtual ports 52 so that the rate of the execution time of the I/O processing that is performed via each of the virtual ports 52 in the unit time T becomes S1:S2:S3: . . . :Sn.

In other words, the QoS setting program 71 sets the period of time for executing the I/O processing in the unit time T so that the I/O processing is executed to the I/O QoS control program 66 of the I/O logical partition 41 corresponding to the virtual port 52 of n=1 for the period of time from the start time of the unit time T up to time T1, which is obtained from the following formula:

[Math. 1]

$$T1 = \frac{S1}{100} \times T \quad (1)$$

and so that the I/O processing is caused to wait for the period of time up to the subsequent end time of the unit time T.

Moreover, the QoS setting program 71 sets the period of time for executing the I/O processing in the unit time T so that the I/O processing to the I/O QoS control program 66 of the I/O logical partition 41 corresponding to the virtual port 52 of n=2 to N is topped for the period of time from the start time of the unit time T to time T2 that is obtained from the following formula:

[Math. 2]

$$T2 = \sum \frac{S(n-1)}{100} \times T \quad (2)$$

and the I/O processing is thereafter executed for the period of time up to time T3 that is obtained from the following formula:

[Math. 3]

$$T3 = \sum \frac{Sn}{100} \times T \quad (3)$$

and the I/O processing is thereafter additionally caused to wait for the period of time up to the end time of the unit time T.

Figure 15:
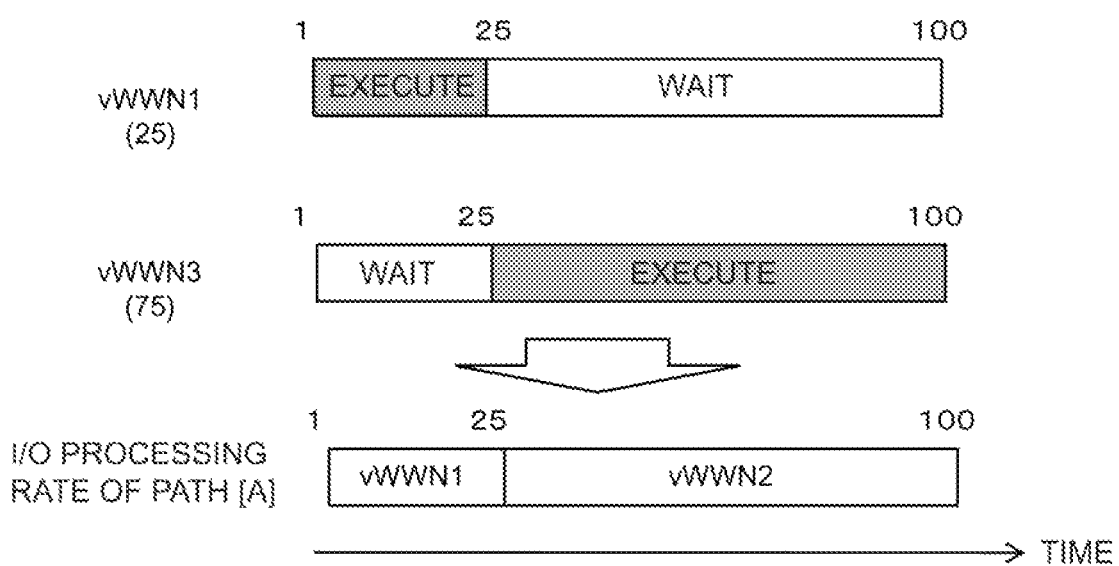
FIG. 15 is an overview diagram explaining the method of setting the share value in the I/O QoS control sub program.

For instance, in the example of FIG. 9, there are two virtual ports 52 connected to the network path indicated as "A"; namely, the virtual port 52 indicated as "vWWN1" and the virtual port 52 indicated as "vWWN3", and the respective share values of these two virtual ports 52 are "25" and "75". Thus, the QoS setting program 71 sets, as shown in FIG. 15, the period of time for executing the I/O processing so that the I/O processing is executed for the period of time that is 25% of the first half of the unit time T and the I/O processing is caused to wait for the period of time of the remaining 75% to the I/O QoS control program 66 of the I/O logical partition 41 corresponding to the virtual port 52 indicated as "vWWN1". Meanwhile, the QoS setting program 71 sets the period of time for executing the I/O processing so that the I/O processing is caused to wait for the period of time that is 75% of the first half of the unit time T and the I/O processing is executed for the period of time of the remaining 25% to the I/O QoS control program 66 of the I/O logical partition 41 corresponding to the virtual port 52 indicated as "vWWN3".

Note that the expression "period of time for causing the I/O processing to wait" used in the foregoing explanation refers to the period of time for buffering the I/O command for writing or reading data to or from the storage apparatus 4 that was issued from the application logical partition 40 via the virtual port 52 in the memory 61 (FIG. 2) or the like of the corresponding I/O logical partition 41, and the expression "period of time for executing the I/O processing" refers to the period of time for performing the I/O processing of data to and from the storage apparatus 4 by sending the buffered I/O command and the I/O command that was issued from the application logical partition 40 corresponding to such period of time to the storage apparatus 4.

Consequently, the I/O QoS control program 66 of each of the I/O logical partitions 41 thereafter buffers the I/O command provided from the corresponding application logical partition 40 in the memory 61 during the period of time other than the period of time for executing the I/O processing and sends the buffered I/O command and the I/O command that was provided from the foregoing application logical partition 40 to the storage apparatus 4 via the corresponding physical port 26 during the period of time for executing the I/O processing according to the setting (setting of the period of time for executing the I/O processing) of the QoS setting program 71 of the management server 2 as described above.

The QoS setting program 71 thereafter starts the QoS command program 72 (FIG. 5). Consequently, the QoS command program 72 sets the period of time for executing the I/O processing, in the unit time T, to the I/O QoS control program 66 (FIG. 4) of each of the corresponding I/O logical partitions 41 based on the share value of the virtual port 52 in each of the application logical partitions 40 stored in the temporary QoS table 77 that was created at step SP27 (SP18).

The QoS setting program 71 thereafter ends the QoS setting processing.

(3-3) Configuration Change Control Processing

As explained above with reference to step SP15 of FIG. 12, if the total required performance value of a plurality of application logical partitions 40 sharing the same network path exceeds the maximum performance of that network path in the QoS setting processing, it is necessary to migrate certain application logical partitions 40 to another physical server 3 in order to maintain the required performance of the application logical partitions 40.

Figure 16:
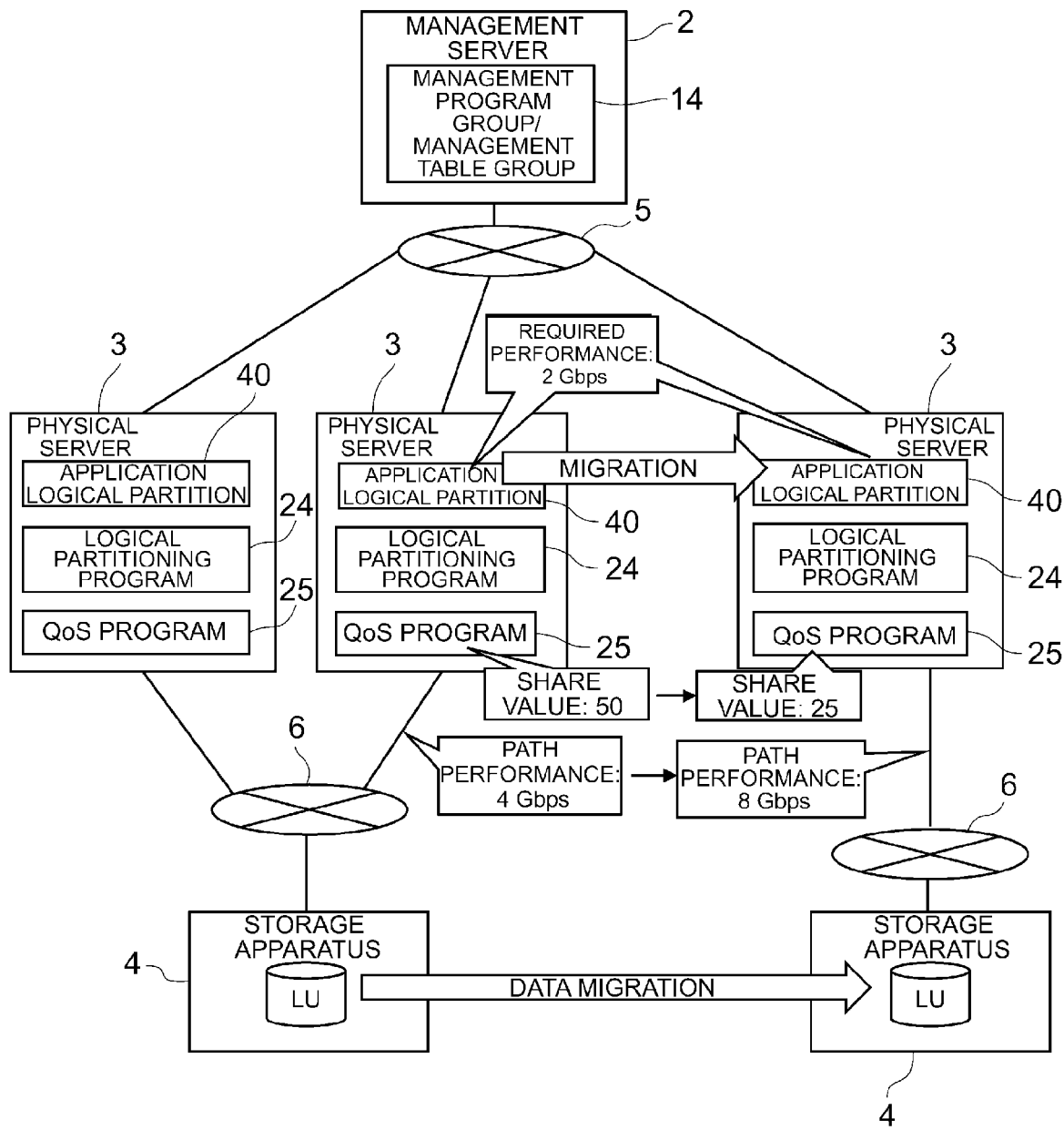
FIG. 16 is an overview diagram explaining the overview.

FIG. 16 shows the state of migrating the application logical partitions 40 to another physical server 3. Even in cases of migrating the application logical partition 40 in a certain physical server 3 to another physical server 3, the required performance of that application logical partition 40 will not change. Meanwhile, the maximum performance of the network path used before the migration is not necessarily the same as the maximum performance of the network path to be used after the migration.

Accordingly, when migrating the application logical partitions 40 to another physical server 3, it is necessary to change, as needed, the share value of the virtual port 52 provided to the application logical partition 40 to be migrated in the network path to be used after the migration according to the maximum performance of the network path to be used after the migration, and the required performance of that application logical partition 40 can thereby be satisfied.

Figure 17:
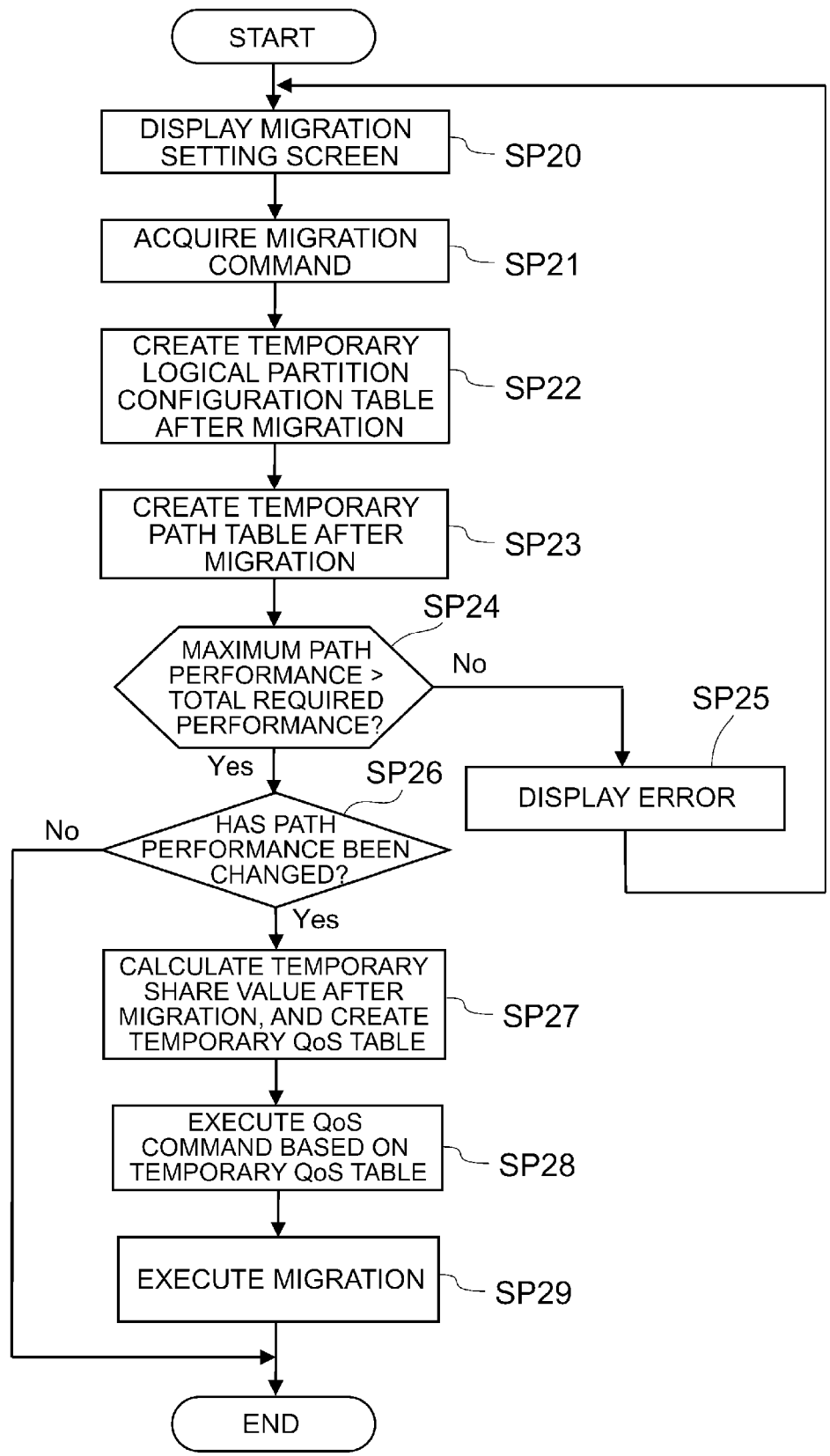
FIG. 17 is a flowchart showing the processing routine of the configuration change control processing.

FIG. 17 shows the processing routine of the configuration change control processing that is executed by the configuration change control program 73 (FIG. 5) in relation to the migration processing of the application logical partitions 40 to another physical server 3. The configuration change control program 73 migrates the application logical partitions 40 designated by the user to another physical server 3 according to the configuration change control processing shown in FIG. 17.

Specifically, the configuration change control program 73 starts the configuration change control processing when the user operates the I/O device 23 of the management server 2 or a communication terminal (not shown) connected to the management server 2 via a network and inputs a prescribed command, and foremost displays a prescribed GUI screen (not shown) (hereinafter referred to as the "migration setting screen") on the I/O device 15 or the display device of the communication terminal (SP20).

Consequently, the user is able to use the migration setting screen and designate the application logical partitions 40 to be migrated and the migration destination physical server 3, and issue a command to the configuration change control program 73 for executing the migration processing of migrating the foregoing application logical partitions 40 to the relevant physical server 3.

When the configuration change control program 73 receives the foregoing command, it acquires the logical partition ID of the migration target application logical partitions 40 and the server ID of the migration destination physical server 3 designated by the user on the migration setting screen (S21).

Subsequently, the configuration change control program 73 creates a temporary logical partition configuration table 74 representing the state after migration by hypothesizing the state after migrating the application logical partitions 40 to the relevant physical server 3 based on the same processing as step SP1 and step SP2 of the configuration acquisition processing described above with reference to FIG. 10 (SP22).

Note that, here, if there is any configuration change in the logical volume LU in the migration source physical server 3 or the migration destination physical server 3, it is necessary to update the logical volume configuration table 75 (FIG. 7) in advance.

Next, the configuration change control program 73 creates a temporary path table 76 (FIG. 8) representing the state after migration by hypothesizing the state after migrating the application logical partitions 40 to the relevant physical server 3 based on the same processing as step SP5 to step SP7 of the configuration acquisition processing described above with reference to FIG. 10

The configuration change control program 73 thereafter compares, for each network path, the maximum performance of that network path stored in the performance column 76E of the path table 76 and the total required performance value of that network path in the foregoing state after migration based on the same processing as step SP13 and step SP14 described above with reference to FIG. 12 based on the temporary logical partition configuration table 74 created at step SP22 and the temporary path table 76 created at step SP23, and determines whether the total required performance value of that network path is smaller than the maximum performance of that network path (SP24).

If the configuration change control program 73 obtains a negative result in the foregoing determination, it displays a warning on the I/O device 13 or the like of the management server 2 displaying the migration setting screen, and thereafter returns to step SP25 (SP20).

Note that, when the foregoing warning is displayed, the user needs to change the migration target application logical partition 40 or the migration destination physical server 3, or perform setting processing using the migration setting screen for migrating, after migrating the migration target application logical partition 40, migrating another application logical partition 40 using the same network path as the foregoing application logical partition 40 to another physical server 3.

Meanwhile, if the configuration change control program 73 obtains a positive result in the determination at step SP24, it compares the maximum performance value of the corresponding network path stored in the performance column 76E corresponding to the migration target application logical partition 40 in the current path table 76 representing the state before migration, and the maximum performance value of the corresponding network path stored in the performance column 76E corresponding to the migration target application logical partition 40 in the temporary path table 76 representing the state after migration that was created at step SP23, and determines whether the two maximum performance values are different (SP26).

If the configuration change control program 73 obtains a negative result in the foregoing determination, it ends the configuration change processing. Meanwhile, if the configuration change control program 73 obtains a positive result, it recalculates the share value of the virtual port 52 in each of the application logical partitions 40 after the migration target application logical partition 40 is migrated to the migration destination physical server 3 based on the same processing of step SP13 and step SP16 of the QoS setting processing described above with reference to FIG. 13, and creates a temporary QoS table 77 (FIG. 9) representing the state after migrating the migration target application logical partition 40 to the migration destination physical server 3 based on the foregoing calculation result (SP27).

Subsequently, the configuration change control program 73 starts the QoS command program 72 (FIG. 5). Consequently, the QoS command program 72 sets the period of time for executing the I/O processing, in the unit time T, to the I/O QoS control program 66 (FIG. 4) of each of the corresponding I/O logical partitions 41 based on the share value of the virtual port 52 of each of the application logical partitions 40 stored in the temporary QoS table 77 created at step SP27 based on the same processing as step SP18 of the QoS setting processing described above with reference to FIG. 12 (SP28).

Next, the configuration change control program 73 issues a command for migrating the migration target application logical partition 40 to the logical partitioning program 24 of the physical server 3 with the migration target application logical partition 40 built therein and/or the logical partitioning program 24 of the migration destination physical server 3 or a program for performing migration control of the application logical partition 40 in the relevant logical partitioning program 24 (SP29). The migration target application logical partition 40 is thereby migrated to the migration destination physical server 3.

Moreover, when the migration of the application logical partition 40 is completed, the configuration change control program 73 thereafter updates the official logical partition configuration table 74, path table 76 and QoS table 77, which are not temporary, based on the temporary logical partition configuration table 74 (FIG. 6) created at step SP22, the temporary path table 76 (FIG. 8) created at step SP23, and the temporary QoS table 77 (FIG. 9) created at step SP27 (SP29).

The configuration change control program 73 thereafter ends the configuration change control processing.

(4) Effect of this Embodiment

According to the computer system 1 of this embodiment described above, as a result of detecting the network path connecting the physical server 3 and the storage apparatus 4 and its maximum performance, and controlling the period of execution time of the I/O processing of the application logical partitions 40 so that the plurality of application logical partitions 40 sharing the same network path will respectively satisfy the required performance of each of the application logical partitions 40 based on the detected network path and its maximum performance and the required performance of each of the application logical partitions 40 built in the physical server 3, it is possible to prevent the I/O processing of an application logical partition 40 from being affected by the I/O processing of another application logical partition 40 using the same network path. Consequently, it is possible to stabilize the I/O performance of a plurality of application logical partitions 40 sharing a network path to the storage apparatus 4.

(5) Other Embodiments

Although the foregoing embodiment explained a case where the management program group and the management table group are stored in the memory of the management server and the management program group is executed by the CPU, the present invention is not limited thereto, and the hardware and/or firmware that is loaded in the management server may be equipped with a function of the respective sub-programs configuring the management program group.

Similarly, although the foregoing embodiment explained a case where the logical partitioning program and the QoS program are stored in the memory of the server and the logical partitioning program and the QoS program are executed by the CPU of the server, the present invention is not limited thereto, and the hardware and/or firmware that is loaded in the server may be equipped with the function of the logical partitioning program and/or the QoS program.

Figure 18:
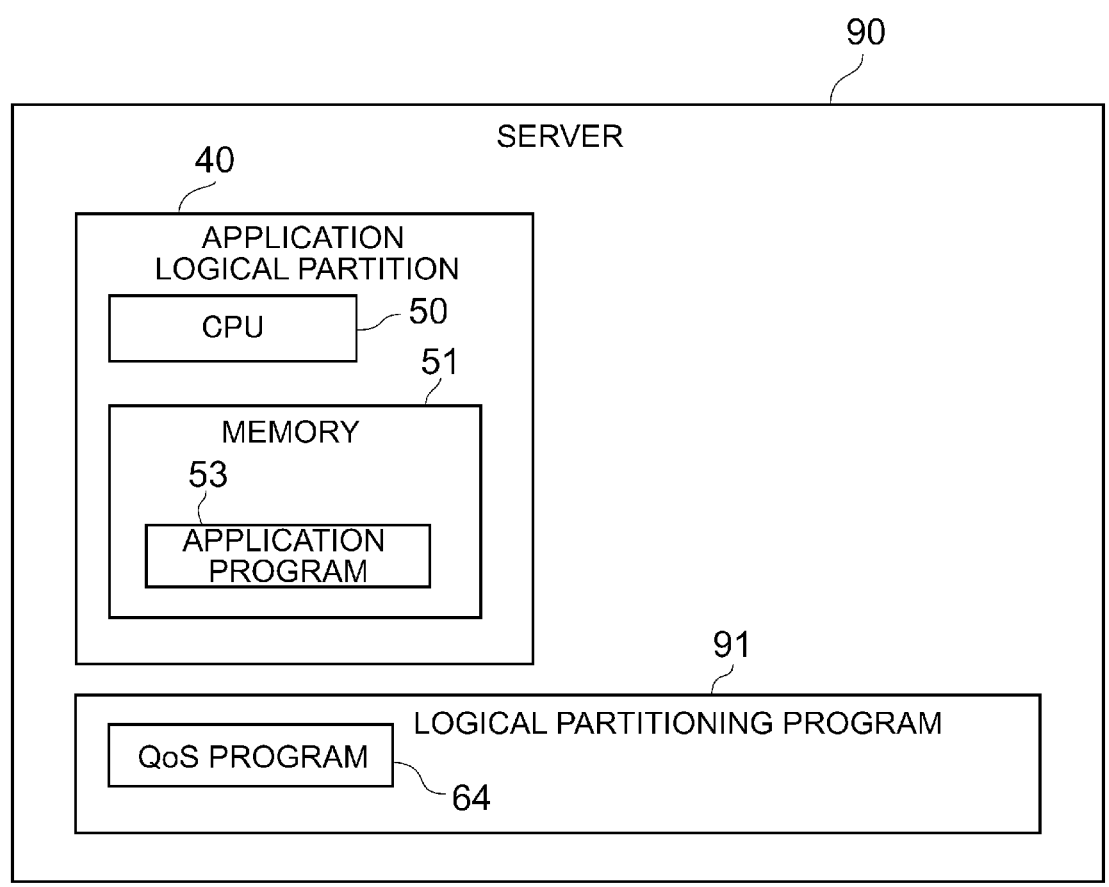
FIG. 18 is a block diagram showing the logical configuration of the server according to another embodiment.

Moreover, although the foregoing embodiment explained a case of storing the QoS program 64 (FIG. 1) in the memory 61 (FIG. 1) of the I/O logical partition 41, the present invention is not limited thereto, and, for example, it may also be provided in the logical partitioning program 91 as shown in FIG. 18 in which the same reference numeral is given to the components corresponding to those shown in FIG. 2.

In addition, although the foregoing embodiment explained a case where the management server 2 sets the period of time for executing the I/O processing, in a unit time T, to the I/O QoS control program 66 of the corresponding I/O logical partition 41 based on the share value of the virtual port 52, the present invention is not limited thereto, and the period of time for causing the I/O processing to wait or both the period of time for executing the I/O processing and the period of time for causing the I/O processing to wait may be set in the I/O QoS control program 66.

INDUSTRIAL APPLICABILITY

The present invention can be broadly applied to computer systems in which a plurality of logical partitions built in the physical server share a network path to the storage apparatus.

REFERENCE SIGNS LIST

1 ... computer system, 2 ... management server, 3 ... physical server, 4 ... storage apparatus, 10, 20, 50, 60 ... CPU, 11, 21, 51, 61 ... memory, 13 ... I/O device, 24, 91 ... logical partitioning program, 25, 64 ... QoS program, 26 ... physical port, 30 ... physical device, 40 ... application logical partition, 41 ... I/O logical partition, 52 ... virtual port, 65 ... inter-logical partition communication program, 66 ... I/O QoS control program, 70 ... configuration acquisition program, 71 ... QoS setting program, 72 ... QoS command program, 73 ... configuration change control program, 74 ... logical partition configuration table, 75 ... logical volume configuration table, 76 ... path table, 77 ... QoS table, 80 ... QoS setting screen.

The invention claimed is:

1. A computer system, comprising:
a plurality of physical servers each with a set of one or more application logical partitions and I/O logical partitions built therein;
a storage apparatus for providing a storage area to the physical servers; and
a management server connected to the physical servers,
wherein the application logical partition of the physical server is configured to execute processing according to a user's application,
wherein the I/O logical partition of the physical server is configured to control execution or wait of I/O processing of the application logical partition,
wherein the management server is configured to:
among network paths connecting the physical server and the storage apparatus, detect the network path that is shared by a plurality of the application logical partitions and a maximum performance of the relevant network path;
calculate, for each of the application logical partitions sharing a relevant network path, a share ratio defined as a ratio of required performance for each of the application logical partitions to the maximum performance of the network path to which each of the application logical partitions is coupled, and set a period of time for a corresponding application logical partition to execute or cause the I/O processing to wait, in a unit time, to each of the I/O logical partitions based on the calculated share ratio of each of the application logical partitions; and wherein the I/O logical partition of the physical server is configured to control the execution or wait of the I/O processing of a relevant application logical partition so that the corresponding application logical partition is configured to execute or cause the I/O processing to wait in the period of time set by the management server, wherein upon receiving a migration command for migrating the application logical partition to another one of the physical servers recalculate the share ratio of each of the application logical partitions sharing the relevant network path based on the maximum performance of the network path that is being used by the relevant application logical partition and the required performance of each of the application logical partitions sharing the relevant network path after migrating the application logical partition to be migrated to the physical server of a migration destination, and set the period of time for the corresponding application logical partition to execute or cause the I/O processing to wait, in a unit time, to each of the I/O logical partitions based on the recalculated share ratio of each of the application logical partitions.

2. The computer system according to claim 1,
wherein a plurality of the physical servers share a timer,
wherein the I/O logical partition of the physical server is configured to control the execution or wait of the I/O processing of the corresponding application logical partition based on the timer, and
wherein the management server is configured to:
calculate the share ratio of each of the application logical partitions based on a rate of the required performance of each of the application logical partitions sharing the network on one hand, and display a warning if a total value of the required performance of a plurality of the application logical partitions sharing the network is greater than the maximum performance of the relevant network path.

3. The computer system according to claim 1,
wherein the plurality of physical servers share a timer, and
wherein the I/O logical partition of the physical server is configured to control the I/O processing of the corresponding application logical partition based on the timer.

4. The computer system according to claim 1,
wherein the management server is configured to calculate the share ratio of each of the application logical partitions based on a rate of the required performance of each of the application logical partitions sharing the network.

5. The computer system according to claim 1,
wherein the management server is configured to display a warning if a total value of the required performance of a plurality of the application logical partitions sharing the network is greater than the maximum performance of the relevant network path.

6. The computer system according to claim 1,
wherein the management server is configured to:
upon receiving a migration command for migrating the application logical partition to another one of the physical servers, recalculate the share ratio of each of the application logical partitions sharing the relevant network path based on the maximum performance of the network path that is being used by the relevant application logical partition and the required performance of each of the application logical partitions sharing the relevant network path after migrating the application logical partition to be migrated to the physical server of a migration destination; and
set the period of time for the corresponding application logical partition to execute or cause the I/O processing to wait, in a unit time, to each of the I/O logical partitions based on the recalculated share ratio of each of the application logical partitions.

7. A performance assurance method in a computer system including a plurality of physical servers, a storage apparatus for providing a storage area to the physical servers, and a management server connected to the physical servers,
wherein each of physical servers has a set of one or more application logical partitions and I/O logical partitions built therein;
wherein the application logical partition of the physical server is configured to execute processing according to a user's application,
wherein the I/O logical partition of the physical server is configured to control execution or wait of I/O processing of the application logical partition, and
wherein the method comprises:
a first step of the management server detecting, among network paths connecting the physical server and the storage apparatus, the network path that is shared by a plurality of the application logical partitions and a maximum performance of a relevant network path;
a second step of the management server calculating, for each of the application logical partitions sharing a relevant network path, a share ratio defined as a ratio of required performance for each of the application logical partitions to the maximum performance of the network path to which each of the application logical partitions is coupled;
a third step of the management server setting a period of time for a corresponding application logical partition to execute or cause the I/O processing to wait, in a unit time, to each of the I/O logical partitions based on the calculated share ratio of each of the application logical partitions; and
a fourth step of the I/O logical partition of the physical server controlling the execution or wait of the I/O processing of a relevant application logical partition so that the corresponding application logical partition is configured to execute or cause the I/O processing to wait in the period of time set by the management server wherein the method further comprises:
a fifth step of the management server recalculating, upon receiving a migration command for migrating the application logical partition to another one of the physical servers, the share ratio of each of the application logical partitions sharing the relevant network path based on the maximum performance of the network path that is being used by the relevant application logical partition and the required performance of each of the application logical partitions sharing the relevant network path after migrating the application logical partition to be migrated to the physical server of a migration destination, and setting the period of time for the corresponding application logical partition to execute or cause the I/O processing to wait, in a unit time, to each of the I/O logical partitions based on the recalculated share ratio of each of the application logical partitions.

8. The performance assurance method according to claim 7,
wherein the second step further comprises the management server calculating the share ratio of each of the application logical partitions based on a rate of the required performance of each of the application logical partitions sharing the network on one hand, and displaying a warning if a total value of the required performance of a plurality of the application logical partitions sharing the network is greater than the maximum performance of the relevant network path,
wherein the fourth step further comprising controlling, using the I/O logical partition of the physical server, the I/O processing of the corresponding application logical partition based on a timer that is shared by a plurality of the physical servers.

9. The performance assurance method according to claim 7,
wherein the fourth step further comprises controlling, using the I/O logical partition of the physical server, the I/O processing of the corresponding application logical partition based on the timer that is shared by a plurality of the physical servers.

10. The performance assurance method according to claim 7,
wherein the second step further comprises the management server calculating the share ratio of each of the application logical partitions based on a rate of the required performance of each of the application logical partitions sharing the network.

11. The performance assurance method according to claim 7,
wherein the second step further comprises the management server displaying a warning if a total value of the required performance of a plurality of the application logical partitions sharing the network is greater than the maximum performance of the relevant network path.

12. The performance assurance method according to claim 7,
wherein the method further comprises:
a fifth step of the management server recalculating, upon receiving a migration command for migrating the application logical partition to another one of the physical servers, the share ratio of each of the application logical partitions sharing the relevant network path based on the maximum performance of the network path that is being used by the relevant application logical partition and the required performance of each of the application logical partitions sharing the relevant network path after migrating the application logical partition to be migrated to the physical server of a migration destination, and setting the period of time for the corresponding application logical partition to execute or cause the I/O processing to wait, in a unit time, to each of the I/O logical partitions based on the recalculated share ratio of each of the application logical partitions.

* * * * *